United States Patent Office 3,454,676
Patented July 8, 1969

3,454,676
BLENDS OF IONOMER RESINS AND ELASTOMERS
Warren F. Busse, Wilmington, Del., assignor to E. I. du Pont de Nemours and Company, Wilmington, Del., a corporation of Delaware
No Drawing. Filed Feb. 1, 1966, Ser. No. 523,963
The portion of the term of the patent subsequent to May 21, 1985, has been disclaimed
Int. Cl. C08f *37/18;* C08d *9/10;* C08c *9/14*
U.S. Cl. 260—897        5 Claims

ABSTRACT OF THE DISCLOSURE

An ionomer resin, which is tough, is blended with an elastomer, such as ethylene/propylene copolymer, which is resilient, to form a blend which exhibits each of these properties, substantially retained.

---

This invention relates to blends of elastomers with ionic copolymers.

It is known that the brittleness of plastics such as polystyrene can be reduced by blending them with semi-compatible polymers such as butadiene-styrene copolymer to give "impact" polystyrene. Under deformation, the resultant blend tends to develop a slightly porous structure, indicated by the whitening of the blend, and this porous structure reduces the stress concentration ahead of a crack that may result from the deformation. This reduction in stress concentration ahead of the crack shows-up as an increase in toughness. The increased toughness of the blend, however, is attained at the cost of decreased resilience, which makes the blend "dead," i.e., the energy of a deforming force is used up on forming the porous structure rather than in rebounding when the deforming force is withdrawn. Thus, the high resilience of each individual component is lost when combined in the form of a blend.

The present invention provides blends of certain tough and resilient plastic resins with resilient elastomers, in which blends both the resilience and toughness of the individual components are largely retained.

The blends of the present invention consist essentially of from 20 to 80% by weight of an elastomer and, complementally, 80 to 20% by wt. of an ionic copolymer prepared by neutralizing with metal ions at least 30% of the acid groups of a copolymer of units derived from an α-olefin of the formula $RCH=CH_2$ wherein R is H or alkyl having from 1 to 8 carbon atoms and from 1.0 to 25 mole percent of units derived from an $\alpha,\beta$-ethylenically unsaturated carboxylic acid. "Derived" means that the polymer units are obtained by copolymerization of the monomers named. In addition to being able to store and return applied energy, the blends of this invention do not have the tendency to develop porosity upon rapid deformation as does impact polystyrene. The blends of this invention thus find use to make shaped articles which are required to withstand impact without undergoing permanent deformation. Examples of such articles are golf ball and protective devices for contact sports, such as shoulder pads for the game of football.

The elastomer component of the blends of this invention can generally be described as any substance which, when cured, can be stretched at room temperature to at least twice its original length and, after having been stretched and the stress removed, returns with force to less than 1.5 times its original length in less than one minute. Examples of elastomers include natural rubber and synthetic rubbers such as the ethylene/propylene copolymers, SBR (butadiene/styrene copolymer), polyisobutylene, polybutadiene, polyisoprene, butyl rubber, chloroprene polymer and copolymers commonly known as neoprene, chlorosulfonated polyethylene, nitrile rubber (butadiene/acrylonitrile copolymers), and butadiene/styrene or acrylonitrile/methacrycil acid copolymers. The ethylene/propylene copolymers can consist solely of ethylene and propylene or can contain additional comonomers as do the copolymers described in U.S. Pats. Nos. 2,933,480 to Gresham, 3,093,620 to Gladding and Robinson, 3,093,621 to Gladding, and 3,000,855 to Tarney. In each of the copolymers described in these patents, a small amount of copolymer units derived from a third monomer are present for the purpose of supplying sulfur curability to the saturated hydrocarbon chain of the copolymer. It should be noted, however, that in the blends of the present invention, the elastomer component need not be cured. The blends can be cured, if desired, by conventional procedures such as incorporating known curing agents into the elastomer prior to fabrication of the ionic copolymer/elastomer blend and then curing the elastomer component after fabrication of the blend.

The ionic copolymer component of the blends of this invention is made by copolymerizing the α-olefin and carboxylic acid, described hereinbefore, preferably but not necessarily following the procedure of Brit. Pat. No. 963,380 to give a copolymer in which the acid derived units are randomly distributed along the copolymer chain. The ionic copolymers used in the Examples herein are random copolymers. The ionic copolymer acts in the solid state as if it were cross-linked and in the molten state as if it were not cross-linked. The resultant acid copolymer by itself or after blending (but before molding) with the elastomer is then intimately contacted with a basic compound containing the particular metal ion desired, to obtain the amount of neutralization desired. The preferred range of neutralization is from 30 to 100% by wt. of the acid groups present. "Neutralization" and variations of this word mean reacting the metal ion with the acid groups of the copolymer to obtain the ionic copolymer. Useful metal ions include those having a valence of 1 to 3 inclusive, and particularly those of Groups I (*a* and *b*) and II (*a* and *b*) and the transition elements of the Periodic Table. Because of the possibility of polyvalent metal ions forming basic salts, as much as 150% of the amount of such metal ion theoretically required for neutralization can be used. The ionic copolymers are described in greater detail in Can. Pats. Nos. 674,595 and 713,631 both to Rees. The preferred mole % of mono- or dicarboxylic acid derived units is from 3 to 15 mole percent. Examples of olefins include ethylene, propylene, butene-1, and hexene-1. Examples of acid include acrylic, methacrylic acids and maleic and fumaric acids and monoalkyl esters and anhydrides thereof.

Preferred blend compositions are those containing from 35 to 65% by wt. of elastomer and, complementally, 65 to 35% by wt. of ionic copolymer.

The elastomer and ionic copolymer components of the blends of this invention can be combined into an intimate mixture by melt blending in conventional equipment such as a Banbury mill, extruder, or the like. Alternatively, the components can be dry mixed together followed by melt fabrication of the dry mixture, by extrusion or injection molding. In the case of injection molding of dry mixtures, screw preplastication or other method of giving good mixing should be employed.

The blends of this invention can be made into a wide variety of useful articles by conventional methods employed in the fabrication of thermoplastic articles, i.e., molded parts, extruded shapes and tubing. Examples of particular articles include football and hockey pads, hard hats, dash board and instrument panels, and refrigerator door liners and trays.

Golf balls of solid, one-piece construction are made from blends of this invention either by injection molding in a suitably dimpled mold to give finished balls in an economical one-step process with only a small amount of trimming of the sprue, or injection molding the blend into smooth spherical balls, and then putting the dimples by a separate conventional compression molding step. Because of the toughness of the blend and the fact that the golf ball is of one-piece construction, it is extremely cut resistant. Preferred blends for making golf balls contain from 35 to 65% by wt. of both elastomer and ionic copolymer and more narrowly from 45 to 55% by wt. of each component, to total 100% in each case. Golf balls made from these blends have suitable bounce and feel upon impact by the golf club head.

Golf balls made from the blends of this invention may be several grams under the maximum permitted weight of standard golf balls (45.9 grams). To increase the weight of the golf ball, fillers having relatively high density can be added to the composition such as during the step in which the elastomer and plastic components are blended. Such fillers include $BaSO_4$, $TiO_2$, pyrites, whiting, clay, $PbSO_4$, $PbO$, $MgCO_3$, basic lead carbonates or silicates, $SnO_2$, chromates, and iron oxides. Fillers such as $TiO_2$ increase the whiteness of the golf ball. Fillers such as $PbCO_3$, $CaCO_3$, and $PbO$ can react with the acid groups of the ionic copolymer during mixing to increase the hardness of the ball. The golf ball can be painted, if desired, to increase its whiteness, by first brushing the ball with toluene, evaporating the toluene, and then applying a standard golf ball paint such as Wittek Golf Ball Enamel. An overcoat of urethane paint, such as Chemical Coatings Corp., GL White Synthetic Paint can then be applied if desired.

In the following examples, parts and percents are by weight unless otherwise indicated.

Example I

Blends of varying proportions of elastomer and ionic copolymer were made by mixing together on a 6″ rubber roll mill at 150° C. and then by chopping the resultant mixture into fine pieces which were fed into a 2 oz. injection molding machine at 180° C. Test results on the molded articles are shown in Tables I and II. The elastomer used was an uncured copolymer of having 63 mole percent of its units derived from ethylene, 35.5 mole percent of its units derived from propylene, and 1.66 mole percent of its units derived from 1,4-hexadiene. The copolymer was made by copolymerizing these monomers in tetrachloroethylene in the presence of a coordination catalyst made by reacting diisobutyl aluminum monochloride with vanadium oxytrichloride. Details of the polymerization procedure and elastomer are described in U.S. Pat. No. 2,933,480. The elastomer had a Mooney viscosity of 40 (ML—4/250° F.). The ionic copolymer was prepared by following the copolymerization procedure of Brit. Pat. No. 963,380 and by neutralizing the resultant copolymer with sodium ions according to the procedure of Can. Pat. No. 674,595. The copolymer contained 83% by wt. of units derived from ethylene and 17% by wt. of units derived from methacrylic acid, 57% neutralized with sodium ions. The melt index of the ionic copolymer before such neutralization was 84 and afterwards was 5.0.

TABLE I

| Ionic copolymer, wt. percent | Elastomer, wt. percent | Durom.[2] hardness (D Scale 30 sec. penetration) | Sclero-scope[2] resilience | Tensile properties[3] | |
|---|---|---|---|---|---|
| | | | | Ultimate strength, p.s.i. | Elong., percent |
| 100 | | 69 | 75 | 4,980 | 325 |
| 75 | [1]25 | 42 | | | |
| 60 | 40 | 37 | 72 | 1,110 | 150 |
| 50 | 50 | 28 | 69 | 800 | 120 |
| 40 | 60 | 18 | 78 | 320 | 86 |

[1] Ethylene/propylene copolymer without the diene third monomer component.
[2] Measured on a stack of four thicknesses of chips cut from ⅛″ molded sheets.
[3] Measured on sheet ¹⁄₁₆″ thick.

Golf balls of various blends of Table I were made by first injection molding solid balls having a smooth surface and then dimpling the smooth balls in a standard golf ball compression mold heated at 120° C. Details of the molding procedure are the same as in the first paragraph of this example. Test results are shown in Table II.

TABLE II

| Ionic copolymer, wt. percent | Elastomer, wt. percent | Ball[1] rebound (inches) | "Click"[2] |
|---|---|---|---|
| 60 | 40 | 42 | + |
| 50 | 50 | 43 | ± |
| 40 | 60 | 42.5 | ± |

[1] Rebound of golf ball dropped from height of 60″ onto an iron plate 6″ x 12″ x 1″ with a smooth rebound surface
[2] Sound of the golf ball in the rebound test as compared to golf ball selling for $1.25 per ball, "+" means somewhat harsher sound, "±" means about the same sound Example II Blends of 50 parts by wt. of the ionic copolymer of Example I and 50 parts by wt. of various elastomers were prepared and golf balls made according to the procedure of Example I. Test results are reported in Table III. Elastomer (A) is the same copolymer of three monomers described in detail in Example I except that it has a Mooney viscosity of 70 (ML—4/250° F.). Elastomer (B) has the same composition as the elastomer of Example I. Elastomer (C) is a copolymer of styrene/butadiene commonly available as SBR 1052. Elastomer (D) is crepe rubber. Elastomer (E) is butyl rubber available as Enjay No. 365. Elastomer (F) is a carboxylated butadiene nitrile rubber available as "Hycar" 1042. Elastomer (G) is a non-sulfur modified polychloroprene made by emulsion polymerization and available as Neoprene type W. Elastomer (H) is a chlorosulfonated polyethylene available as "Hypalon" synthetic rubber. The elastomers of this Example and the other Examples herein did not contain any curing agents.

TABLE III

| Elastomer | Durom. hardness (D scale) | Scleroscope resilience | Tensile strength, p.s.i. | Ultimate elongation, percent |
|---|---|---|---|---|
| A | 28 | 69 | 800 | 120 |
| B | 25 | 68 | 380 | 40 |
| C | 25 | 66 | 420 | 30 |
| D | 30 | 66 | 430 | 60 |
| E | 25 | 50 | 390 | 50 |
| F | 30 | 64 | 1,750 | 50 |
| G | 44 | 63 | 1,030 | 70 |
| H[1] | 51 | 38 | 2,120 | 160 |

[1] Milled about 10 min. at 100° C. rather than 150° C.

Example III

Blends of different ionic copolymers and the elastomer of three monomers described in Example I were prepared and tested and golf balls made and tested according to Example I. The ionic copolymers of ethylene and methacrylic acid and were prepared according to the procedure set forth in Example I. Details of the compositions and test results are reported in Table IV.

TABLE IV

| | Ionic Copolymer | | | | | | | | | |
|---|---|---|---|---|---|---|---|---|---|---|
| Amt. wt. percent | Acid, wt. percent | Percent Neut. | Metal ion | Elastomer, wt. percent | Ball rebound (inches) | "Click" | Dur. hard. D | Scleroscope resilience | Tensile strength | Ult. elong. |
| 50 | 17 | 57 | Na | 50 | 42.5 | ± | 28 | 69 | 800 | 120 |
| 60 | 11 | 58 | Na | 40 | 38.5 | + to ± | 32 | 73 | 1,090 | 220 |
| 50 | 11 | 58 | Na | 50 | 39.5 | + | 24 | 73 | | |
| 40 | 11 | 58 | Na | 60 | 40.0 | ± | 18 | 68±4 | 370 | 140 |
| 60 | 12 | ²60 | Mg Zn | 40 | 40.0 | + to ± | 33 | 78 | 1,450 | 200 |
| 50 | 12 | ²60 | Mg Zn | 50 | 40.0 | ± | 28 | 78 | 740 | 77 |
| 40 | 12 | ²60 | Mg Zn | 60 | 40.5 | ± | 18 | 78 | 450 | 93 |
| 50 | 15 | 59 | Na | 50 | 42.5 | ± | 27 | 73 | 860 | 180 |
| 50 | 12 | 64 | Zn¹ | 50 | 39.5 | ++ | 30 | 75±3 | | |

¹ Zn chelated with tetramethylenetetramine.  ² 50% neutralized with Mg and 10% neutralized with Zn.

As many apparently widely different embodiments of this invention may be made without departing from the spirit and scope thereof, it is to be understood that this invention is not limited to the specific embodiments thereof except as defined in the appended claims.

What is claimed is:

1. A blend which is tough and resilient, consisting essentially of from 35 to 65 percent by weight of an elastomer which is natural rubber, ethylene/propylene copolymer, butadiene/styrene copolymer, polyisobutylene, polybutadiene, polyisoprene, butadiene/acrylonitrile copolymer, or acrylonitrile/methacrylic acid copolymer with, complementally to total 100 percent, from 65 to 35 percent by weight of an ionic copolymer of units derived from ethylene and 1.0 to 25 mole percent of units derived from an alpha, beta-ethylenically unsaturated mono- or di-carboxylic acid, with at least 30 percent of the acid groups of said acid being neutralized by metal ions having a valence of 1 to 3 when the acid is mono-carboxylic and a valence of 1 when the acid is di-carboxylic.

2. A blend which is tough and resilient, consisting essentially of from 20 to 80 percent by weight of ethylene/propylene copolymer elastomer which contains additional elastomer monomer units which impart sulfur curability to the copolymer, with, complementally to total 100 percent, from 80 to 20 percent by weight of an ionic copolymer of units derived from ethylene and 1.0 to 25 mole per cent of units derived from an alpha, beta-ethylenically unsaturated mono- or di-carboxylic acid, with at least 30 percent of the acid groups of said acid being neutralized by metal ions having a valence of 1 to 3 when the acid is mono-carboxylic and a valence of 1 when the acid is di-carboxylic.

3. The blend of claim 2 wherein said monomer units are derived from 1,4-hexadiene.

4. The blend of claim 1 wherein said carboxylic acid is methacrylic acid.

5. The blend of claim 1 wherein said ionic copolymer is a random copolymer.

References Cited

UNITED STATES PATENTS

| | | | |
|---|---|---|---|
| 2,806,824 | 9/1957 | Semegen | 260—4 |
| 2,880,186 | 3/1959 | Barth | 260—5 |
| 2,929,795 | 3/1960 | Reid et al. | 260—4 |
| 2,933,480 | 4/1960 | Gresham et al. | 260—80.78 |
| 3,035,011 | 5/1962 | Bartl et al. | 260—897 |
| 3,238,156 | 3/1966 | Kohrn | 260—2.5 |
| 3,264,272 | 8/1966 | Rees | 260—88.1 |
| 3,384,612 | 5/1968 | Brandt et al. | 260—897 |
| 3,284,380 | 11/1966 | Davis | 260—889 |
| 3,326,833 | 6/1967 | Raley | 260—889 |

MURRAY TILLMAN, *Primary Examiner.*

C. J. SECCURO, *Assistant Examiner.*

U.S. Cl. X.R.

260—4, 41, 41.5, 78.5, 88.1, 889; 273—218

PO-1050
(5/69)

UNITED STATES PATENT OFFICE
CERTIFICATE OF CORRECTION

Patent No. 3,454,676          Dated July 8, 1969

Inventor(s) Warren F. Busse

It is certified that error appears in the above-identified patent and that said Letters Patent are hereby corrected as shown below:

Column 5, Claim 2, line 40, cancel "elastomer"; and
Column 5, Claim 2, line 41, after copolymer insert
-- elastomer --.

SIGNED AND
SEALED
JUN 23 1970

(SEAL)
Attest:

Edward M. Fletcher, Jr.
Attesting Officer

WILLIAM E. SCHUYLER, JR.
Commissioner of Patents